United States Patent
Kondo

(10) Patent No.: US 9,881,086 B2
(45) Date of Patent: Jan. 30, 2018

(54) IMAGE SHOOTING DEVICE, IMAGE SHOOTING METHOD, AND RECORDING MEDIUM

(71) Applicant: FUJIFILM Corporation, Tokyo (JP)

(72) Inventor: Michitaka Kondo, Yokohama (JP)

(73) Assignee: FUJIFILM Corporation, Tokyo (JP)

( * ) Notice: Subject to any disclaimer, the term of this patent is extended or adjusted under 35 U.S.C. 154(b) by 170 days.

(21) Appl. No.: 15/084,675

(22) Filed: Mar. 30, 2016

(65) Prior Publication Data
US 2016/0292880 A1  Oct. 6, 2016

(30) Foreign Application Priority Data
Mar. 30, 2015 (JP) ................ 2015-068710

(51) Int. Cl.
G06F 17/30 (2006.01)
(52) U.S. Cl.
CPC .............. G06F 17/30793 (2013.01)
(58) Field of Classification Search
None
See application file for complete search history.

(56) References Cited

U.S. PATENT DOCUMENTS

| | | | |
|---|---|---|---|
| 2007/0115363 A1 | 5/2007 | Nakamura | |
| 2008/0050035 A1* | 2/2008 | Tsurumi | G06F 3/0486 382/276 |
| 2009/0040324 A1 | 2/2009 | Nonaka | |
| 2009/0322896 A1* | 12/2009 | Yoshizumi | H04N 1/2112 348/222.1 |
| 2010/0097398 A1* | 4/2010 | Tsurumi | H04N 5/144 345/634 |
| 2011/0221922 A1 | 9/2011 | Matsumoto et al. | |
| 2012/0020524 A1* | 1/2012 | Ishikawa | H04N 7/183 382/103 |
| 2012/0189167 A1* | 7/2012 | Kurata | H04N 5/145 382/107 |

(Continued)

FOREIGN PATENT DOCUMENTS

| | | |
|---|---|---|
| JP | 2007-142866 A | 6/2007 |
| JP | 2009-044602 A | 2/2009 |

(Continued)

OTHER PUBLICATIONS

Moving Image Photo ! Service ([online]), FUJIFILM Corporation, [searched on Feb. 9, 2015], URL: http://fujifilm.jp/personal/print/photo/dogaphoto/, pp. 1-3.

*Primary Examiner* — Reza Aghevli
(74) *Attorney, Agent, or Firm* — Studebaker & Brackett PC

(57) ABSTRACT

In the image shooting device, the image shooting method and the recording medium, the person detector detects the person in the moving image and set the person as the detected person. The person evaluator evaluates the detected person based on the action of the detected person exhibited during the certain period of time in the past and give the detected person the score. The person determiner determines that the detected person is the target person, when the score of the detected person is higher than the predetermined value. And the shooting assist section assists the action of the shooting person and the target person so that the target person is included in the moving image.

18 Claims, 8 Drawing Sheets

(56) References Cited

U.S. PATENT DOCUMENTS

| | | | | |
|---|---|---|---|---|
| 2013/0293741 A1* | 11/2013 | Nishi | .................... | H04N 5/225 |
| | | | | 348/222.1 |
| 2014/0184834 A1* | 7/2014 | Miyasako | .......... | H04N 5/23254 |
| | | | | 348/208.1 |
| 2015/0002546 A1* | 1/2015 | Nakao | .................... | H04N 1/387 |
| | | | | 345/634 |

FOREIGN PATENT DOCUMENTS

| JP | 2010-161644 A | 7/2010 |
|---|---|---|
| JP | 2011-211695 A | 10/2011 |

\* cited by examiner

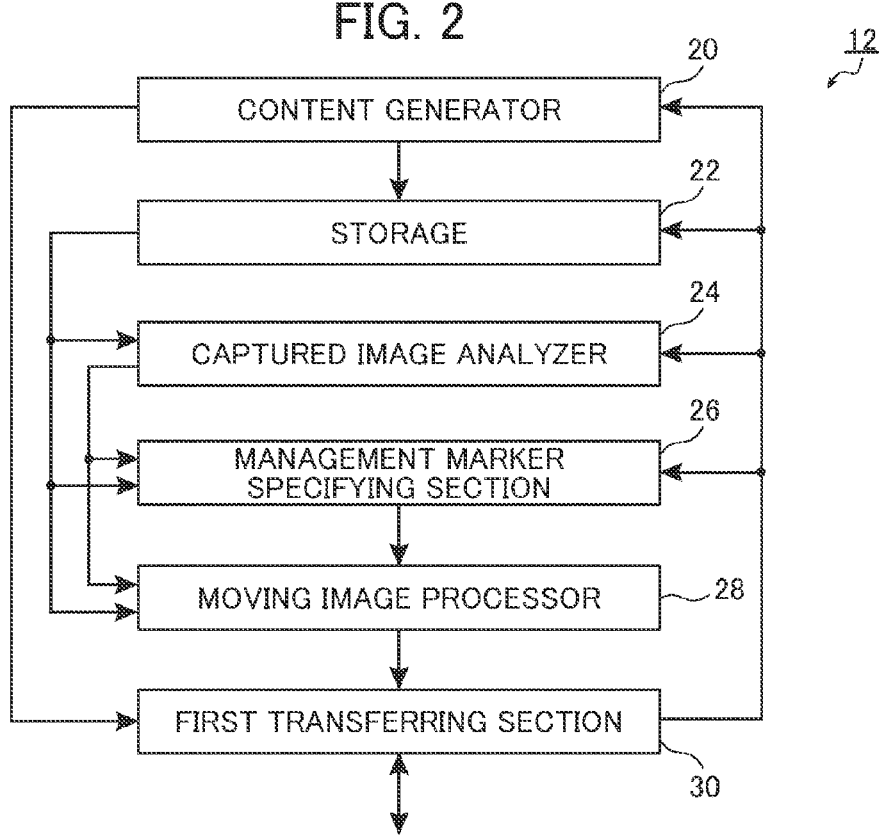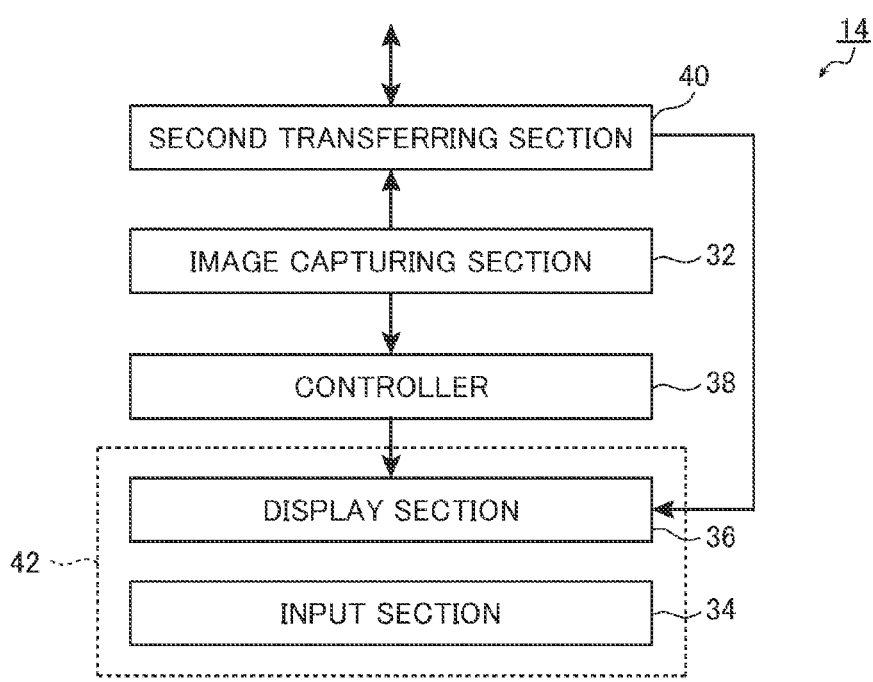

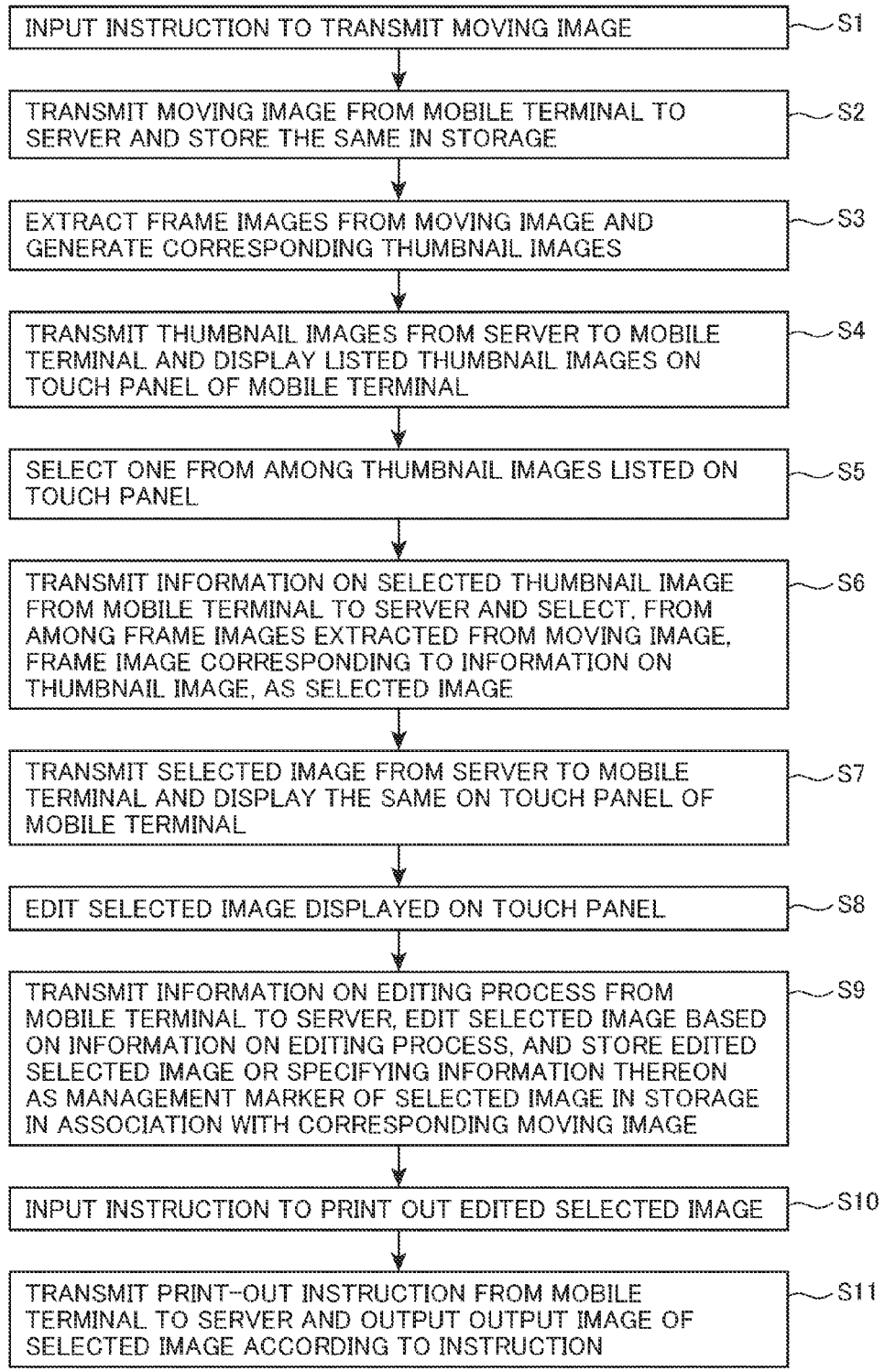

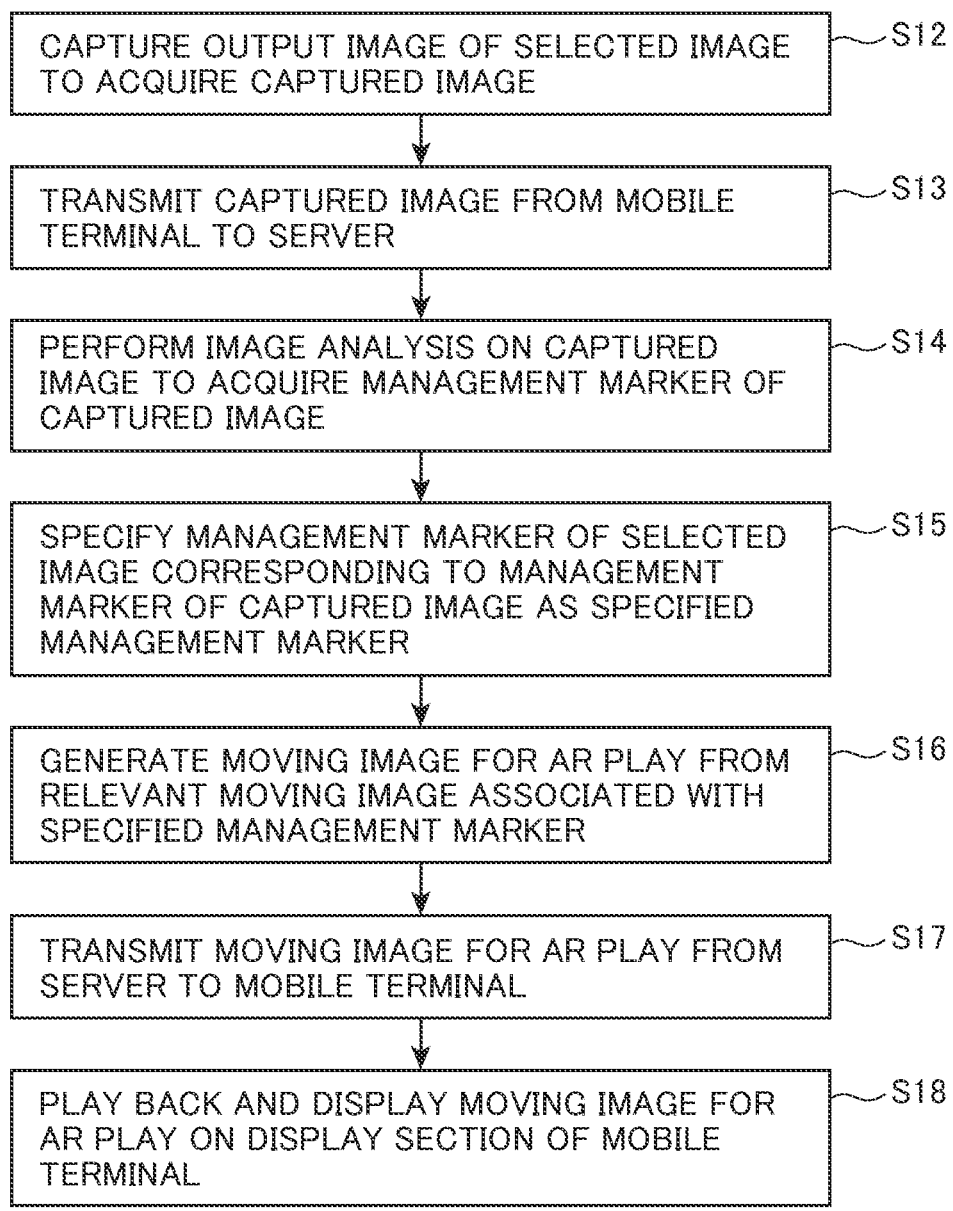

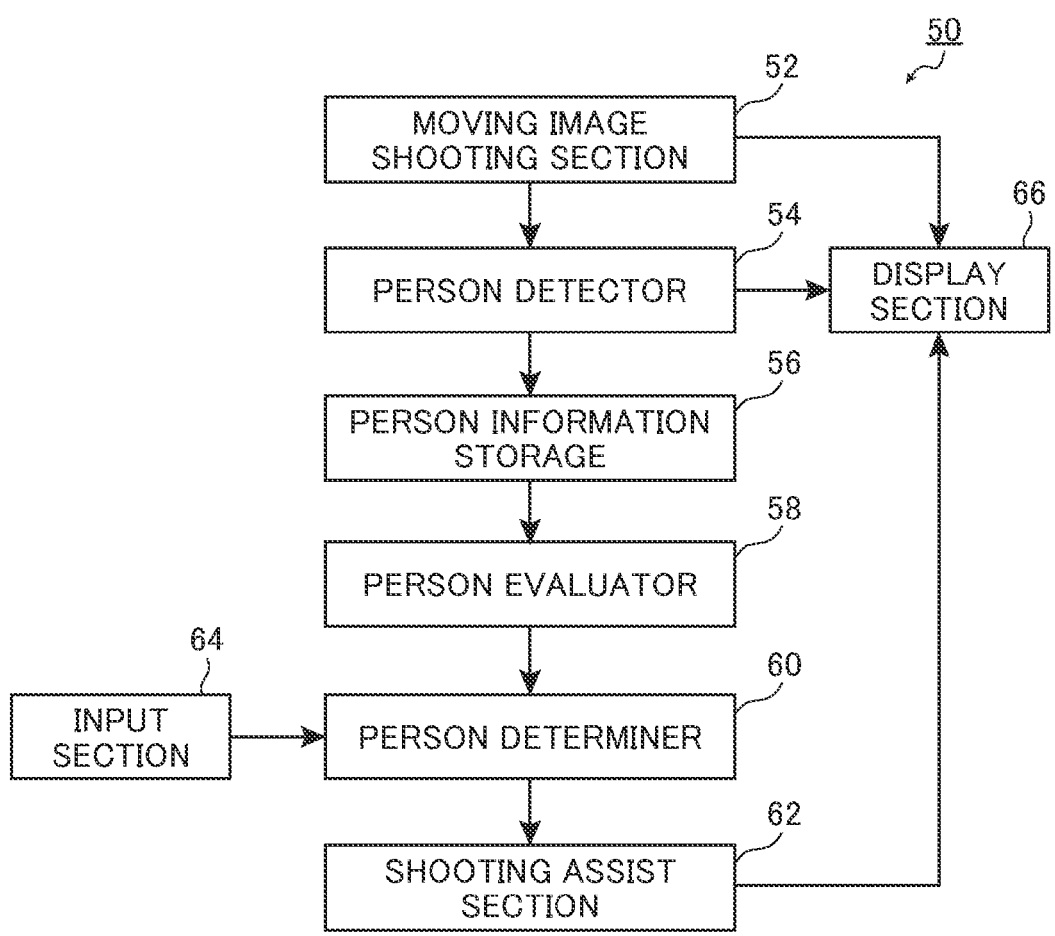

MOVING DIRECTION OF SHOOTING POSITION OF MOVING IMAGE

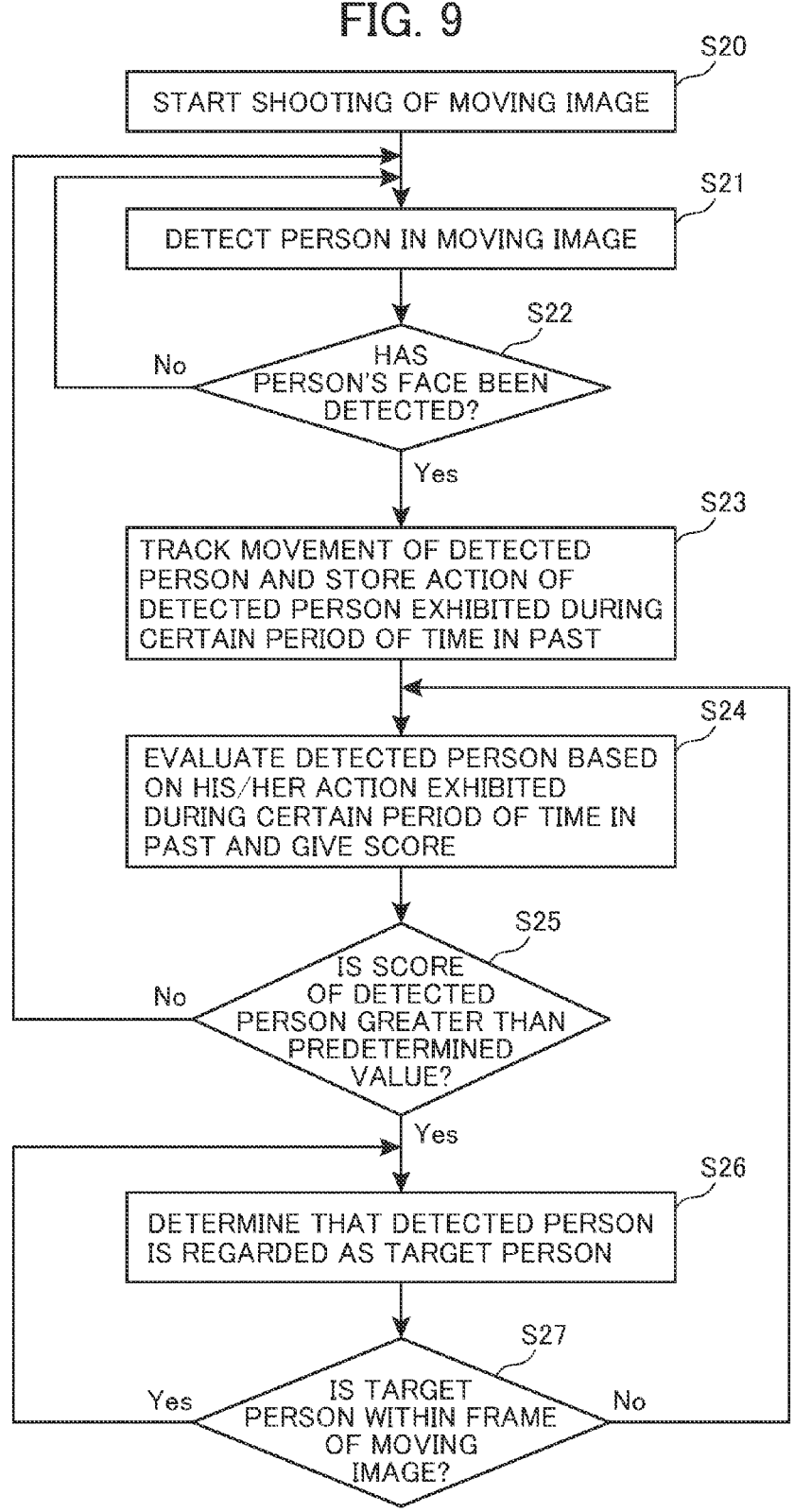

IMAGE SHOOTING DEVICE, IMAGE SHOOTING METHOD, AND RECORDING MEDIUM

CROSS-REFERENCE TO RELATED APPLICATIONS

The present application claims priority under 35 U.S.C. §119 to Japanese Patent Application No. 2015-068710, filed on Mar. 30, 2015. The above application is hereby expressly incorporated by reference, in its entirety, into the present application.

BACKGROUND OF THE INVENTION

The present invention relates to an image shooting device, an image shooting method and a recording medium having an assist function for assisting the shooting of moving images to be used in, for instance, a system that generates prints of frame images extracted from moving images (hereinafter referred to also as "moving image print(s)").

Nowadays, mobile terminals such as smart phones and tablet terminals are rapidly becoming popular. The number of still images (photographs) taken by such mobile terminals are increasing accordingly, and at the same time, chances to shoot moving images are also increasing. At present, as a service using moving images, there is provided a system with an augmented reality (AR) technology, in which upon the imaging or capturing of a print such as a photograph with a mobile terminal, a moving image associated with the print is played back (AR-played) on a screen of the mobile terminal, as shown in the website of "moving image photo! service" ([online], FUJIFILM Corporation, [searched on Feb. 9, 2015], URL: http://fujifilm.jp/personal/print/photo/dogaphoto/).

In this system, a moving image associated with a print is AR-played according to the following steps (1) to (6).
(1) Once a user selects, through a dedicated application that operates in a mobile terminal, a moving image the user desires to use for a print from among moving images, the selected moving image is uploaded to a server.
(2) In the server, a frame image of a representative scene is extracted from the moving image uploaded from the mobile terminal.
(3) The frame image of a representative scene extracted in the server is downloaded to the mobile terminal.
(4) The user selects, from among frame images of representative scenes listed on a screen of the mobile terminal, a frame image the user desires to print to thereby place an order for printing.
(5) In the server, a print of the frame image of a representative scene ordered by the user is generated, and a moving image associated with this frame image is image-processed for AR play.
(6) Once the user captures a delivered print with the mobile terminal, a moving image for AR play associated with this print is downloaded from the server and AR-played on the screen of the mobile terminal by means of the AR technology.

Moving images used in the system that generates moving image prints as above are ones shot by image shooting devices having a common function for shooting moving images.

A moving image print generated by the foregoing system has a role as a still image and a role as a moving image. Therefore, a moving image used for generating a moving image print needs to be shot so as to include a scene suitable for both a still image and a moving image. Conventional image shooting devices, however, do not have means of checking during the shooting of a moving image as to whether a content of the moving image is suitable for generation of moving image prints, and consequently, a shot moving image is sometimes not suitable for moving image prints.

Now JP 2007-142866 A, JP 2009-44602 A, JP 2011-211695 A and JP 2010-161644 A are mentioned as prior art literatures related to the present invention.

JP 2007-142866 A relates to an imaging apparatus that, when a user shoots a particular person while following the person, assists the user to frame the person, but the assist function does not work when the person is out of the frame.

JP 2009-44602 A relates to an imaging apparatus that, in order to have a variety of image contents, gives notice when images of similar contents are continuously shot. The apparatus needs to have a still image previously registered for use in determining the similarity of contents.

JP 2011-211695 A relates to a shooting assist method for imaging a plurality of persons in a well-balanced proportion in shooting photographs, but it is impossible with the method to automatically determine as to whether a person is actually a target subject a photographer intends to shoot.

JP 2010-161644 A relates to an electronic camera that generates thumbnail images for moving images with the intention of the camera person being reflected in the thumbnail images with good accuracy, i.e., that specifies a main person based on the frequency of appearance of smiles and takes, as a thumbnail image, the frame in which the main person specified is seen as a large figure.

Besides the four literatures above, there is known a technique to make judgments on target persons to be shot on an individual basis and when a target person keeps smiling for a certain period of time, automatically release a shutter. The technique, however, does not function when a target person is out of the frame.

SUMMARY OF THE INVENTION

An object of the invention is to overcome the above problems of the related art and provide an image shooting device, an image shooting method and a recording medium capable of shooting moving images suitable for generation of moving image prints.

In order to attain the object, the present invention provides an image shooting device, comprising:
a moving image shooting section adapted to shoot a moving image;
a person detector adapted to detect a person in the moving image and set the person as a detected person;
a person information storage adapted to track a movement of the detected person and store therein action of the detected person exhibited during a certain period of time in past;
a person evaluator adapted to evaluate the detected person based on the action of the detected person exhibited during the certain period of time in the past and give the detected person a score;
a person determiner adapted to determine that the detected person is a target person who a shooting person of the moving image intends to shoot, when the score of the detected person is higher than a predetermined value; and
a shooting assist section adapted to assist action of at least one of the shooting person and the target person so that the target person is included in the moving image.

Also, the present invention provides an image shooting method, comprising:

a step of shooting a moving image with a moving image shooting section;

a step of detecting a person in the moving image and setting the person as a detected person, with a person detector;

a step of tracking movement of the detected person and storing action of the detected person exhibited during a certain period of time in past, with a person information storage;

a step of evaluating the detected person based on the action of the detected person exhibited during the certain period of time in the past and giving the detected person a score, with a person evaluator;

a step of determining, with a person determiner, that the detected person is a target person who a shooting person of the moving image intends to shoot, when the score of the detected person is higher than a predetermined value; and a step of assisting action of at least one of the shooting person and the target person so that the target person is included in the moving image, with a shooting assist section.

Also, the present invention provides a non-transitory computer readable recording medium having recorded thereon a program adapted to cause a computer to execute each of the steps of the image shooting method according to above.

The present invention detects a person from a moving image being shot, tracks the movement of the detected person, stores the action exhibited during a certain period of time in the past, evaluates the detected person and gives a score based on the action exhibited during the certain period of time in the past, automatically determines that the detected person is regarded as a target person when the score is greater than a predetermined value and that the detected person is not regarded as a target person any more when the score is not greater than the predetermined value, and assists the action of at least one of the shooting person and the target person so that the target person is included in the moving image.

According to the present invention, since the action of at least one of the shooting person and the target person is assisted during the shooting of a moving image on a real-time basis, the shooting person can shoot a moving image suitable for generation of moving image prints.

BRIEF DESCRIPTION OF THE DRAWINGS

FIG. 2 is a block diagram showing an example of the configuration of a server shown in FIG. 1.

FIG. 3 is a block diagram showing an example of internal configuration of a mobile terminal shown in FIG. 1.

FIG. 4 is an exemplary flowchart showing the operation of the image processing apparatus when an AR content is generated and an output image of a selected image is output.

FIG. 6 is an exemplary flowchart showing the operation of the image processing apparatus when a moving image for AR play is generated, and played back and displayed.

FIG. 7 is a block diagram showing the configuration of an image shooting device of the invention in an embodiment.

FIG. 9 is an exemplary flowchart showing the operation of the image shooting device shown in FIG. 7.

DETAILED DESCRIPTION OF THE INVENTION

An image shooting device, an image shooting method and a recording medium of the present invention are described below in detail with reference to a preferred embodiment shown in the accompanying drawings.

Before the explanation on the image shooting device of the invention, the explanation on an image processing apparatus for generating moving image prints is first made.

Figure 1:
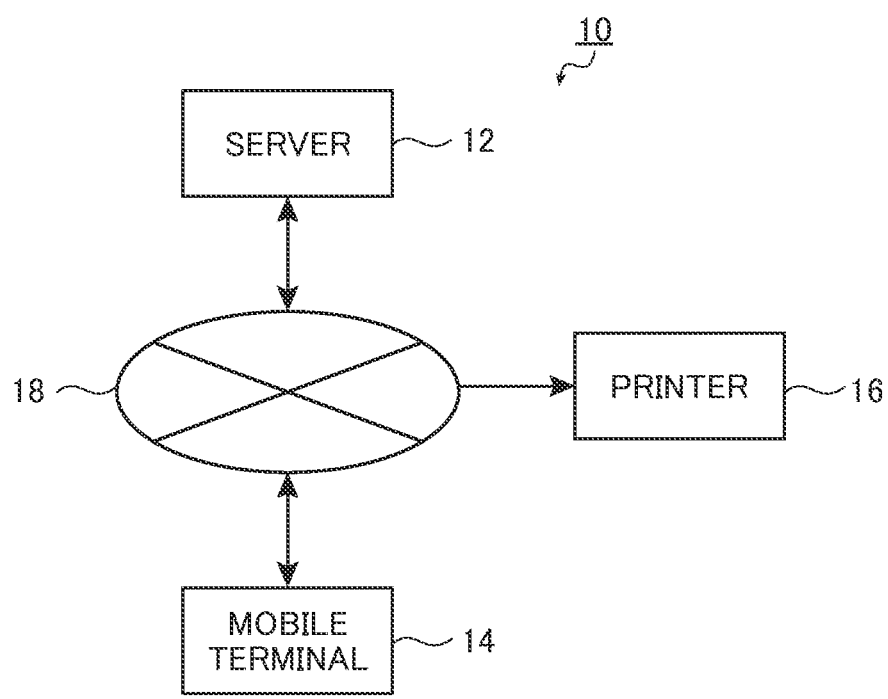
FIG. 1 is a block diagram showing an example of the configuration of an image processing apparatus for generating moving image prints.

FIG. 1 is a block diagram showing an example of an configuration of the image processing apparatus for generating moving image prints. An image processing apparatus 10 shown in FIG. 1 plays back and displays a moving image associated with an output image (moving image print) when the output image is captured, and includes a server 12, a mobile terminal 14 and a printer 16. The server 12, the mobile terminal 14 and the printer 16 are interconnected via a network 18 such as the Internet.

FIG. 2 is a block diagram showing an example of the configuration of the server shown in FIG. 1. The server 12 shown in FIG. 2 includes a content generator 20, a storage 22, a captured image analyzer 24, a management marker specifying section 26, a moving image processor 28 and a first transferring section 30.

The content generator 20 extracts frame images from a moving image and generates an AR content in which the moving image is associated with a selected image that is a frame image selected by the user of the mobile terminal 14 from among the frame images extracted from the moving image.

The method of extracting frame images from a moving image is not limited. For example, the user may manually extract desired frame images from a moving image, or frame images may be extracted from a moving image at regular time intervals.

Alternatively, a key frame extraction (KFE) technique may be used to extract a key frame image at a point of scene transition. The KFE is used to, for example, analyze each frame image in a moving image to detect the color, the brightness, motion blurs, out-of-focus blurs and the like of the frame image, and extract frame images present before and after the significant change in color or brightness, or frame images without any motion blur or any out-of-focus blur owing to the proper exposure.

Still alternatively, the size or the direction of a face of a person, or the facial expression (e.g., smiling, crying) in a moving image may be detected to extract frame images based thereon. When a moving image has sound, frame images may be extracted from a portion of the moving image around the time (time code) at which the sound increases. By extracting frame images from a moving image by any of the foregoing methods, representative scenes of the moving image can be extracted as the frame images.

The storage 22 stores various types of data therein. For instance, the storage 22 stores an AR content generated by the content generator 20, that is, stores a selected image or specifying information thereon as a management marker of the selected image, in association with the relevant moving image.

The management marker refers to the amount of image characteristics as acquired from a still image by subjecting the still image to image analysis using a predetermined algorithm and includes, for example, edge information, edge position information and other information on a subject in the still image. The management marker may be a still image itself or specifying information used to specify the still image. The specifying information on a still image may be any kind of information as long as it is useful for specifying a selected image from a captured image.

The captured image analyzer 24 performs image analysis on a captured image, which will be described later, to acquire a management marker of the captured image.

The management marker specifying section 26 specifies, from among management markers of selected images stored in the storage 22, a management marker of a selected image corresponding to a management marker of a captured image acquired by the captured image analyzer 24, as a specified management marker. For instance, the management marker specifying section 26 specifies a management marker of a selected image corresponding to a management marker of a captured image by conducting a search within management markers of selected images stored in the storage 22 based on the management marker of the captured image.

The moving image processor 28 generates a moving image for AR play from the relevant moving image associated with the specified management marker. In other words, the moving image processor 28 generates a moving image for AR play from the relevant moving image based on the specified management marker, i.e., based on a frame image selected by the user from among frame images extracted from the moving image, or specifying information on the selected frame image.

The moving image processor 28 reduces, for example, the resolution or the bit rate of a moving image to decrease the file size of the moving image, thereby generating a moving image for AR play with a small file size.

The first transferring section 30 is used to transfer various types of data including moving images, captured images and the like between the server 12 and the mobile terminal 14.

FIG. 3 is a block diagram showing an example of internal configuration of the mobile terminal shown in FIG. 1. The mobile terminal 14 is a smart phone, a tablet terminal, or the like used by the user and as shown in FIG. 3, includes an image capturing section 32, an input section 34, a display section 36, a controller 38 and a second transferring section 40.

The image capturing section 32 captures, for instance, an output image (AR print) obtained by outputting a selected image to thereby obtain a captured image.

The input section 34 is used by the user to input various instructions.

The display section 36 is used to play back and display a moving image and the like.

In this embodiment, the input section 34 and the display section 36 are constituted by a touch panel 42.

The controller 38 performs the control in such a manner that, when an output image is captured by the image capturing section 32, a moving image for AR play generated based on the captured image is played back and displayed on the display section 36.

The controller 38 may play back a moving image on the display section 36 by means of the AR technology (AR play) or without the AR technology (normal play). In the AR play of a moving image, the controller 38 performs the control in such a manner that a captured output image is displayed on the display section 36 and the moving image is played back at the portion where the output image is displayed on the display section 36. In the normal play of a moving image, the controller 38 performs the control in such a manner that the moving image is played back over the entire screen or in a window of any size on the display section 36.

The second transferring section 40 is used to transfer various types of data including moving images, captured images and the like between the mobile terminal 14 and the server 12.

Next, the explanation is made on the operation of the image processing apparatus 10 when an AR content is generated and an output image (moving image print) of a selected image is output, with reference to the flowchart of FIG. 4.

Figure 5A:
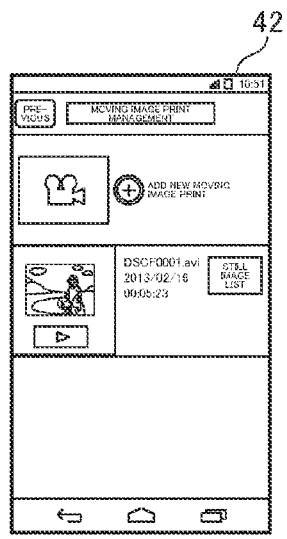
FIGS. 5A to 5E are conceptual diagrams each showing one example of a display screen of a display section of the mobile terminal.

First, while viewing a moving image print management screen displayed on the touch panel 42 (display section 36) of the mobile terminal 14 as shown in FIG. 5A, the user operates the touch panel 42 (input section 34) to input an instruction to transmit a moving image (moving image data) (Step S1).

The moving image the user has instructed to transmit is transmitted by the second transferring section 40 from the mobile terminal 14 to the server 12 via the network 18. In the server 12, the moving image transmitted from the mobile terminal 14 is received by the first transferring section 30 and stored in the storage 22 (Step S2).

Subsequently, the content generator 20 extracts frame images (image data) from the received moving image and generates thumbnail images (image data) of the extracted frame images (Step S3).

Figure 5B:
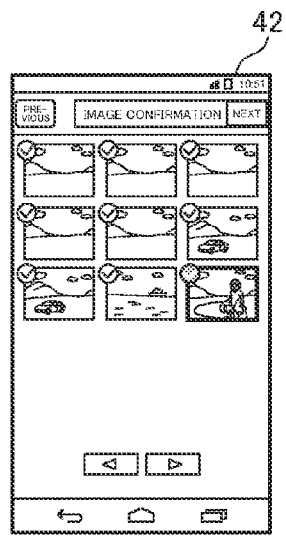

The generated thumbnail images are transmitted from the server 12 to the mobile terminal 14. In the mobile terminal 14, the received thumbnail images are listed in an image confirmation screen on the touch panel 42 (display section 36) as shown in FIG. 5B (Step S4).

Subsequently, the user operates the touch panel 42 (input section 34) to select one from among the listed thumbnail images on the touch panel 42 (display section 36) (Step S5). In the example shown in FIG. 5B, it is assumed that the thumbnail image surrounded by the thick frame at the bottom right is selected.

Information on the selected thumbnail image is transmitted from the mobile terminal 14 to the server 12. In the server 12, the content generator 20 selects, from among the frame images extracted from the moving image, a frame image corresponding to the received information on the thumbnail image, as a selected image (Step S6).

In place of the thumbnail image, the frame image extracted from the moving image may be used.

Subsequently, the selected image (image data) is transmitted from the server 12 to the mobile terminal 14. In the mobile terminal 14, the received selected image is displayed on the touch panel 42 (display section 36) of the mobile terminal 14 (Step S7).

Figure 5C:
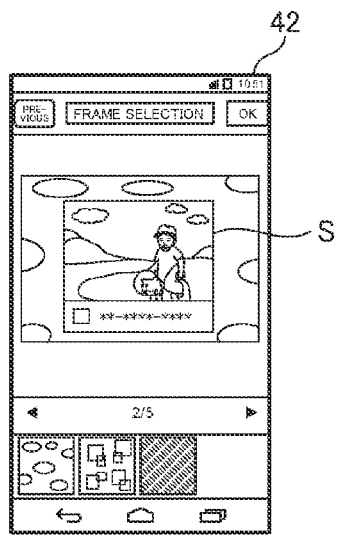
Figure 5D:
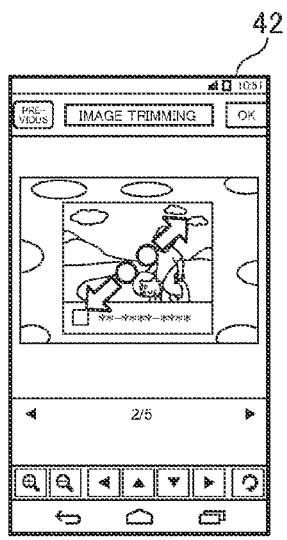

Subsequently, the user operates the touch panel 42 (input section 34) to edit the selected image displayed on the touch panel 42 (display section 36) (Step S8). The editing process carried out by the user for example includes: selection of a background frame to be a background of the selected image, which is made in a frame selection screen shown in FIG. 5C; and image correction, trimming, scaling, rotating and the like of the selected image, which are made in an image trimming screen shown in FIG. 5D.

Subsequently, information on the editing process is transmitted from the mobile terminal 14 to the server 12. In the server 12, the content generator 20 edits the selected image based on the received information on the editing process.

The edited, selected image or specifying information thereon is stored as a management marker of the selected image in the storage 22 in association with the corresponding moving image (Step S9).

It should be noted that editing the selected image is not indispensable.

Figure 5E:
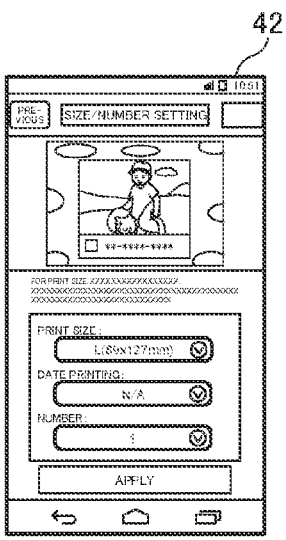

Subsequently, the user operates the touch panel 42 (input section 34) to set the print size, the number of prints and the like in a size and number setting screen shown in FIG. 5E and inputs an instruction to print out the edited, selected image (Step S10).

The print-out instruction is transmitted from the mobile terminal 14 to the server 12. The selected image according to the received print-out instruction is transmitted from the server 12 to the printer 16, whereupon the printer 16 outputs an output image (print) of the selected image (Step S11).

The output image is delivered to the user.

Thus, an AR content in which the moving image is associated with the selected image extracted from the moving image is stored in the storage 22, while the output image of the selected image is output.

Next, the explanation is made on the operation of the image processing apparatus 10 when a moving image for AR play is generated, and played back and displayed, with reference to the flowchart of FIG. 6.

First, the output image (print) of the selected image is captured with the image capturing section 32 to acquire a captured image (image data) (Step S12). The captured output image is displayed on the touch panel 42 (display section 36) of the mobile terminal 14.

The acquired, captured image is transmitted by the second transferring section 40 from the mobile terminal 14 to the server 12 via the network 18. In the server 12, the captured image transmitted from the mobile terminal 14 is received by the first transferring section 30 (Step S13).

Subsequently, the captured image analyzer 24 performs image analysis on the captured image to acquire a management marker of the captured image (Step S14).

Subsequently, the management marker specifying section 26 specifies, from among management markers of selected images stored in the storage 22, a management marker of the selected image corresponding to the management marker of the captured image, as a specified management marker (Step S15).

The moving image processor 28 generates a moving image for AR play from the relevant moving image associated with the specified management marker (Step S16).

Subsequently, the moving image for AR play generated by the moving image processor 28 is transmitted from the server 12 to the mobile terminal 14. The mobile terminal 14 receives the moving image for AR play transmitted from the server 12 (Step S17).

Upon receiving the moving image for AR play, the mobile terminal 14 plays back and displays the received moving image for AR play at the portion where the output image is displayed on the touch panel 42 (display section 36) under control of the controller 38 (Step S18).

Thus, when the output image is captured, the management marker of the selected image corresponding to the management marker of the captured image is specified, whereafter the moving image for AR play is generated from the relevant moving image associated with the specified management marker and played back and displayed at the mobile terminal 14.

When an output image of a selected image is output, an access key composed of a character string including figures or letters may be printed on the output image of the selected image. The access key is uniquely determined for each user. In specifying a management marker as a specified management marker from among management markers of selected images stored in the storage 22, the access key input by a user serves to limit candidates to the range of management markers of selected images associated with a certain moving image transmitted to the server 12 by the user.

The use of the mobile terminal 14 is not essential, and use may be made of any control device such as a personal computer having the image capturing section 32, the input section 34, the display section 36, the controller 38 and the second transferring section 40.

Next, the image shooting device of the invention is described.

FIG. 7 is a block diagram showing the configuration of the image shooting device of the invention in an embodiment. An image shooting device 50 shown in FIG. 7 is provided to shoot moving images to be used in, for example, a system that generates moving image prints, such as the image processing apparatus 10 shown in FIG. 1, and includes a moving image shooting section 52, a person detector 54, a person information storage 56, a person evaluator 58, a person determiner 60, a shooting assist section 62, an input section 64 and a display section 66.

The moving image shooting section 52 is provided to shoot moving images to be used in, for example, a system that generates moving image prints.

The person detector 54 detects a person in a moving image shot with the moving image shooting section 52 and sets the person as a detected person. For instance, the person detector 54 sequentially extracts frame images from a moving image that is being shot, detects a person's face in each frame image extracted, and when a person's face is detected from a frame image, outputs the person having the detected face as a detected person.

The person information storage 56 tracks the movement of the detected person as detected from the moving image by the person detector 54, and stores therein the action of the detected person exhibited during a certain period of time in the past, for instance, from one and a half minutes ago through the present time.

The action of the detected person herein may include not only information on the movement of the detected person but also information on the face expression, the position and the size of the face region of the detected person, the position of the detected person in the frame of the moving image, the looking direction the detected person, whether the detected person is alone or not in the moving image, the length of time the detected person is in the moving image, the motion of the detected person, the sound produced by the detected person, and other information. In addition, the action of the detected person may include information on the relation between the detected person and another person or an object, more specifically, on the movement and motion of the detected person when, for instance, he/she shakes hands with another person, has a talk, holds a ball or takes exercise, or information on the relation between the movement of the detected person and the shooting date, the shooting location or the like.

The person evaluator 58 evaluates the detected person based on his/her action exhibited during a certain period of time in the past as stored in the person information storage 56, and gives the detected person a score.

The person evaluator 58 changes the score of the detected person depending on whether the detected person smiles, whether the size of the face region of the detected person is large, whether the detected person is in the center of the frame of the moving image, whether the detected person looks into the image shooting device, whether the detected person is alone in the moving image, the length of time the detected person is in the moving image, whether the detected person is out of the frame of the moving image, and other factors.

When the detected person smiles, is in the center of the frame of the moving image, is alone in the frame of the moving image, or looks into the image shooting device during a certain period of time in the past, the person evaluator 58 increases the score of the detected person. Moreover, the person evaluator 58 increases the score of the detected person with increasing size of the face region of the detected person in the frame of the moving image or increasing length of time the detected person is in the frame of the moving image during a certain period of time in the past.

In contrast, the person evaluator 58 decreases the score of the detected person with increasing length of time the detected person is out of the frame of the moving image during a certain period of time in the past.

The person evaluator 58 may change the score depending on one of the foregoing factors or two or more thereof in combination.

The person determiner 60 determines that the detected person is a target person the shooting person of the moving image intends to shoot, when the person evaluator 58 gives the detected person a score higher than a predetermined value. When the score of the target person has become equal to or lower than the predetermined value, the person determiner 60 determines that the detected person is not regarded as a target person any more. In other words, the person determiner 60 determines that the detected person is regarded as a target person when his/her score exceeds a predetermined value and that the detected person is not regarded as a target person when his/her score is equal to or lower than the predetermined value.

The person determiner 60 may determine that, among detected persons included in a moving image that is being shot and displayed on the display section 66, a detected person specified by the user through the input section 64 is a target person.

The shooting assist section 62 assists the action of at least one of the shooting person and the target person so that the target person is included (or shot) in the moving image.

Figure 8A:
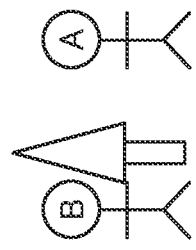
FIGS. 8A to 8E are exemplary conceptual diagrams illustrating the shooting of a moving image with the shooting position moving from right to left.

For instance, the case is considered in which a scene with a person A standing to the right of a tree and a person B standing to the left of the tree is shot for a moving image while the shooting position (image shooting device 50) is moved from right to left as camera work, as shown in FIG. 8A.

Figure 8E:
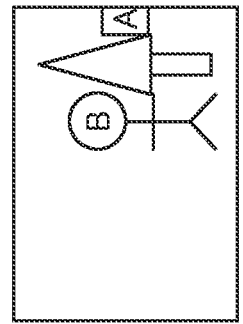
Figure 8D:
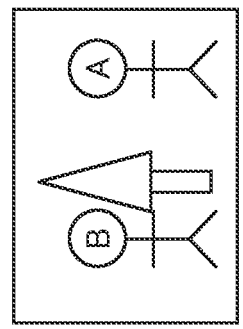
Figure 8C:
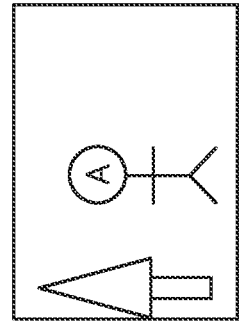
Figure 8B:
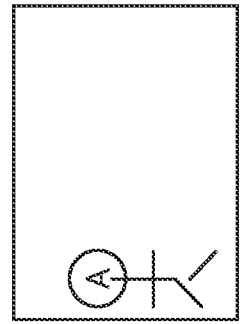

In this case, as a subject or subjects within the frame of the moving image being shot, the person A is first shot as shown in FIG. 8B, subsequently the person A and the tree standing to the left thereof are shot as shown in FIG. 8C, and then the person A, the tree, and the person B standing to the left of them are shot as shown in FIG. 8D. Continuously shooting the moving image with the shooting position being moved from right to left, the person A first goes out of the frame as shown in FIG. 8E.

When a target person is predicted to go out of the frame of a moving image based on the relative relationship between the moving direction of the shooting position of the moving image and the moving direction of the target person, in other words, before the scene of FIG. 8D is changed to the scene of FIG. 8E, the shooting assist section 62 can notify at least one of the shooting person and the target person that the target person is predicted to go out of the frame of the moving image.

As a result, the target person can be prevented from going out of the frame of the moving image, so that the target person can remain in the moving image, and thus the moving image suitable for generation of moving image prints can be shot.

The shooting assist section 62 may display, on the screen of the display section 66, an icon for informing the prediction that the target person will go out of the frame of the moving image, or notify at least one of the shooting person and the target person of the prediction by the aid of sound or flash.

In addition, when the target person goes out of the frame of the moving image as in the case where the scene changes from FIG. 8D to FIG. 8E, the shooting assist section 62 may notify the shooting person of the direction to the target person having gone out of the frame, until the target person returns to the inside of the frame but at most until a certain period of time elapses after the target person has gone out of the frame (i.e., until the score of the target person becomes equal to or lower than a predetermined value and the target person is determined to be not regarded as a target person any more).

With this, the shooting person can know, in addition to the positions of persons in the moving image being shot, the current position of the target person who is temporarily out of the frame of the moving image (i.e., the direction to the target person). Thus, even when a target person goes out of the frame of a moving image, the shooting person can shoot the moving image so as to make the target person having gone out of the frame again included in the moving image, and the moving image suitable for generation of moving image prints can be shot.

The shooting assist section 62 may display an arrow indicative of the direction to a target person having gone out of the frame, on the display section 66 on which the moving image being shot is displayed, and the arrow may blink on the display section 66.

Alternatively, the shooting assist section 62 may display an icon representing a target person having gone out of the frame, for example in the middle of an edge (side) of the screen of the display section 66 on which the moving image being shot is displayed, the edge corresponding to the direction to the target person having gone out of the frame of the moving image. Such icons may be composed of symbols A, B and C representing the target persons of the person A, the person B and the person C as shown in FIG. 8E, and alternatively the faces of the persons A, B and C may be designed as icons. In this case, the shooting assist section 62 may also make the icon blink.

When a plurality of target persons are shot in a moving image, the shooting assist section 62 may notify the shooting person of the direction to a target person with a cumulative shooting time shorter than those of the other target persons so that the plurality of target persons can evenly appear in the moving image. In this case, the shooting assist section 62 stores cumulative shooting times of the respective target persons, i.e., the lengths of time the respective target persons appear in the moving image, and notifies the shooting person of, for instance, the direction to a target person with the shortest cumulative shooting time.

With this, the shooting person can shoot a moving image so as to make a plurality of target persons evenly appear in the moving image, and the moving image suitable for generation of moving image prints can be shot.

It should be noted that it is impossible to simultaneously implement the process of, when a target person goes out of the frame of a moving image, notifying the shooting person of the direction to the target person having gone out of the frame and the process of, when there are a plurality of target persons, notifying the shooting person of the direction to a target person with a cumulative shooting time shorter than those of the other target persons. To cope with it, setting the former process as a first mode and the latter process as a second mode, the shooting assist section 62 may operate one of the modes according to the selection by the user.

When a target person is not smiling or when there is not much speaking voice, the shooting assist section 62 may give at least one of the shooting person and the target person notice of the fact so as to urge the target person to smile or speak more.

With this, a moving image with a smiling or speaking target person, that is to say, a moving image suitable for generation of moving image prints can be shot.

In this case, the shooting assist section 62 may display a comment saying, for instance, "talk to the target person and make him/her smile" on the display section 66 or give audio notice to notify the shooting person of the situation. In response to such notice, the shooting person talks to the target person, which can make the target person smile or speak. Alternatively, notice may be given to a target person by flash light to draw attention of the target person, whereby the target person looking into the shooting device can be shot.

While the cases where the shooting position of a moving image moves are taken as examples, the invention is not limited thereto and is applicable to the cases where a target person moves, and where the shooting position of a moving image and a target person both move (i.e., move relative to each other).

The input section 64 is used to receive various instructions input by the user of the image shooting device 50, such as an instruction for specifying a detected person, who is to be a target person, from among detected persons included in a moving image that is being shot and displayed on the display section 66.

The display section 66 is used to display a moving image being shot or play back and display a moving image having been shot. On the display section 66, there is also displayed an arrow indicative of the direction to a target person having gone out of the frame of a moving image, an icon representing a target person having gone out of the frame of a moving image, or the like.

For example, the input section 64 and the display section 66 may be constituted by a touch panel.

Next, the operation of the image shooting device 50 is described with reference to the flowchart shown in FIG. 9.

The shooting of a moving image with the moving image shooting section 52 starts (Step S20).

Subsequently, the person detector 54 detects a person in the moving image shot by the moving image shooting section 52 (Step S21). For instance, frame images are sequentially extracted from the moving image being shot, and a person's face is detected in each frame image extracted.

Subsequently, it is checked as to whether a person's face, that is, a person has been detected from a frame image (Step S22).

When a person's face has not been detected (No in Step S22), the operation returns to Step S21 where a person's face is again detected.

When a person's face has been detected (Yes in Step S22), the movement of the detected person detected from the moving image by the person detector 54 is tracked, and the action of the detected person during the certain period of time in the past is stored in the person information storage 56 (Step S23).

Subsequently, the person evaluator 58 evaluates the detected person based on his/her action exhibited during a certain period of time in the past and gives a score (Step S24).

Subsequently, the person determiner 60 checks as to whether the score of the detected person given by the person evaluator 58 is greater than a predetermined value (Step S25).

When the score of the detected person is not greater than the predetermined value (No in Step S25), the operation returns to Step S21 where a person's face is again detected.

When the score of the detected person is greater than the predetermined value (Yes in Step S25), the person determiner 60 determines that the detected person is regarded as a target person (Step S26).

Subsequently, it is checked as to whether the target person is within a frame of the moving image being shot (Step S27).

When the target person is within the frame of the moving image (Yes in Step S27), the operation returns to Step S26 where the person determiner 60 determines that the detected person is still regarded as a target person.

When the target person is not within the frame of the moving image, i.e., is out of the frame of the moving image (No in Step S27), the operation returns to Step S24 where the person evaluator 58 evaluates the target person and decreases the score of the target person with increasing length of time the target person is out of the frame of the moving image.

Thereafter, the person determiner 60 checks as to whether the score of the target person is greater than the predetermined value as described above (Step S25).

When the score of the target person is not greater than the predetermined value (No in Step S25), the person determiner 60 determines that the target person is not regarded as a target person any more, and the operation returns to Step S21 where a person's face is again detected.

When the score of the target person is greater than the predetermined value (Yes in Step S25), the person determiner 60 determines that the target person is still regarded as a target person (Step S26). The following operation is implemented in the same manner.

The operation described above is repeated until the shooting of the moving image with the moving image shooting section 52 is finished.

The image shooting device 50 detects a person from a moving image being shot, tracks the movement of the detected person, stores the action exhibited during a certain period of time in the past, evaluates the detected person and gives a score based on the action exhibited during the certain period of time in the past, automatically determines that the detected person is regarded as a target person when the score is greater than a predetermined value and that the target person is not regarded as a target person any more when the score is not greater than the predetermined value, and assists the action of at least one of the shooting person and the target person so that the target person is included in the moving image.

In the image shooting device 50, since the action of at least one of the shooting person and the target person is assisted during the shooting of a moving image on a real-time basis, the shooting person can shoot a moving image suitable for generation of moving image prints.

The image shooting device of the invention is applied not only in shooting moving images to be used in a system that generates moving image prints but also in shooting attractive moving images showing target persons.

The device of the present invention may be composed of constituent elements that are dedicated hardware devices or composed of a computer in which operations of the constituent elements are programmed.

The method of the present invention can be carried out by, for instance, a program that causes a computer to implement steps of the method. A computer readable recording medium having the program recorded thereon may also be provided.

This invention is basically as described above.

While the present invention has been described above in detail, the invention is not limited to the above embodiment, and various improvements and modifications may be made without departing from the spirit and scope of the invention.

What is claimed is:

1. An image shooting device, comprising:
a moving image shooting camera that shoots a moving image;
a person detector that detects a person in the moving image and sets the person as a detected person;
a person information memory that tracks a movement of the detected person and stores therein action of the detected person exhibited during a certain period of time in past;
a person evaluator that evaluates the detected person based on the action of the detected person exhibited during the certain period of time in the past and give the detected person a score;
a person determiner that determines that the detected person is a target person who a shooting person of the moving image intends to shoot, when the score of the detected person is higher than a predetermined value; and
a shooting assist section that assists action of at least one of the shooting person and the target person so that the target person is included in the moving image,
wherein the person evaluator increases the score of the detected person with increasing size of a face region of the detected person in a frame of the moving image during the certain period of time in the past; and
wherein the person detector, the person evaluator, the person determiner and the shooting assist section are composed of a dedicated hardware or a computer that upon executing instructions stored on a non-transitory memory causes the shooting camera to perform the recited functions of the person detector, the person evaluator, the person determiner and the shooting assist section.

2. The image shooting device according to claim 1, wherein the person evaluator increases the score of the detected person when the detected person smiles during the certain period of time in the past.

3. The image shooting device according to claim 1, wherein the person evaluator increases the score of the detected person when the detected person is in center of a frame of the moving image during the certain period of time in the past.

4. The image shooting device according to claim 1, wherein the person evaluator increases the score of the detected person when the detected person looks into the image shooting device during the certain period of time in the past.

5. The image shooting device according to claim 1, wherein the person evaluator increases the score of the detected person when the detected person is alone in a frame of the moving image during the certain period of time in the past.

6. The image shooting device according to claim 1, wherein the person evaluator increases the score of the detected person with increasing length of time the detected person is in a frame of the moving image during the certain period of time in the past.

7. The image shooting device according to claim 1, wherein the person evaluator decreases the score of the detected person with increasing length of time the detected person is out of a frame of the moving image during the certain period of time in the past.

8. The image shooting device according to claim 7, wherein when the score of the detected person has become equal to or lower than the predetermined value, the person determiner determines that the detected person is not regarded as a target person any more.

9. The image shooting device according to claim 1, wherein the person determiner determines that, among detected persons included in the moving image that is being shot and displayed on a display section, a detected person specified by a user through an input section is the target person.

10. The image shooting device according to claim 1, wherein when the target person is predicted to go out of a frame of the moving image based on relative relationship between a moving direction of a shooting position of the moving image and a moving direction of the target person, the shooting assist section notifies at least one of the shooting person and the target person that the target person is predicted to go out of the frame of the moving image.

11. The image shooting device according to claim 1, wherein when the target person goes out of a frame of the moving image, the shooting assist section notifies the shooting person of a direction to the target person having gone out of the frame of the moving image, until the target person returns to inside of the frame of the moving image but at most until a certain period of time elapses after the target person has gone out of the frame of the moving image.

12. The image shooting device according to claim 11, wherein the shooting assist section displays an arrow indicative of a direction to the target person having gone out of the frame of the moving image, on a display section on which the moving image being shot is displayed.

13. The image shooting device according to claim 11, wherein the shooting assist section displays an icon representing the target person having gone out of the frame of the moving image in middle of an edge of a screen of a display section on which the moving image being shot is displayed, the edge corresponding to a direction to the target person having gone out of the frame of the moving image.

14. The image shooting device according to claim 1, wherein when a plurality of the target persons are shot in the moving image, the shooting assist section stores cumulative shooting times each of which is length of time each of the plurality of target persons appears in the moving image, and notifies the shooting person of a direction to one target person with a cumulative shooting time shorter than those of other target persons so that the plurality of target persons can evenly appear in the moving image.

15. The image shooting device according to claim 1, wherein when the target person is not smiling or when there is not much speaking voice, the shooting assist section gives notice to at least one of the shooting person and the target person so as to urge the target person to smile or speak more.

16. The image shooting device according to claim 15, wherein the shooting assist section gives notice to the shooting person by displaying a comment on a display section on which the moving image being shot is displayed or by giving audio notice.

17. An image shooting method, comprising:
shooting a moving image with a moving image shooting camera;
detecting a person in the moving image and setting the person as a detected person, with a person detector;
tracking movement of the detected person and storing action of the detected person exhibited during a certain period of time in past, with a person information memory;
evaluating the detected person based on the action of the detected person exhibited during the certain period of time in the past and giving the detected person a score, with a person evaluator;
determining, with a person determiner, that the detected person is a target person who a shooting person of the moving image intends to shoot, when the score of the detected person is higher than a predetermined value; and
assisting action of at least one of the shooting person and the target person so that the target person is included in the moving image, with a shooting assist section,
wherein the person evaluator increases the score of the detected person with increasing size of a face region of the detected person in a frame of the moving image during the certain period of time in the past; and
wherein the person detector, the person evaluator, the person determiner and the shooting assist section are composed of a dedicated hardware of a computer that upon executing instructions stored on a non-transitory memory causes the shooting camera to perform the recited functions of the person detector, the person evaluator, the person determiner and the shooting assist section.

18. A non-transitory computer readable recording medium having recorded thereon a program adapted to cause a computer to execute each of the steps of the image shooting method according to claim 17.

* * * * *